United States Patent [19]

Persson et al.

[11] 4,099,026

[45] Jul. 4, 1978

[54] LOUDSPEAKER FOR VEHICLES

[76] Inventors: Per Persson, Radhusgatan 3; Leo Koppelomaki, Almgatan 23, both of S-330 23 Smalandssenar, Sweden

[21] Appl. No.: 778,856

[22] Filed: Mar. 18, 1977

[30] Foreign Application Priority Data

Mar. 19, 1976 [SE] Sweden .............................. 7603422

[51] Int. Cl.² ............................................. H04R 1/02
[52] U.S. Cl. .................................. 179/1 VE; 181/144
[58] Field of Search ........... 179/1 VE, 146 R, 146 H, 179/156 R; 181/144, 148, 150, 153; 325/312

[56] References Cited

U.S. PATENT DOCUMENTS 1,732,451  10/1929  Walters et al. ....................... 325/312
3,268,229  8/1966  Funk ..................................... 181/144

FOREIGN PATENT DOCUMENTS 72,323  4/1960  France .................................. 325/312

Primary Examiner—George G. Stellar
Attorney, Agent, or Firm—Albert L. Jeffers; Roger M. Rickert

[57] ABSTRACT

A loudspeaker system for vehicles wherein a monolithic, elongated element including end portions thereof constituting loudspeaker cabinets. The elongated element is preferably designed in such a way that it has a close fit against the ceiling of the vehicle in which the loudspeaker system is to be mounted, whereby the elongated element can have an open upper end facing the ceiling.

6 Claims, 2 Drawing Figures

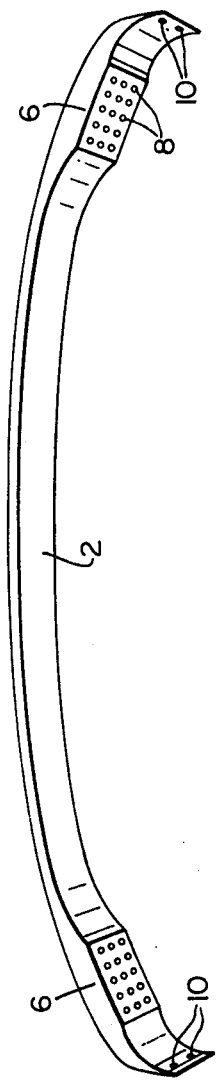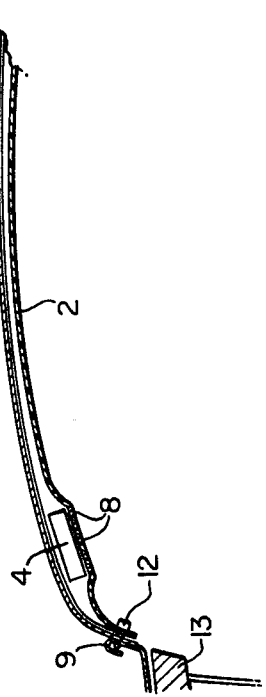

LOUDSPEAKER FOR VEHICLES

BACKGROUND OF THE INVENTION

1. FIELD OF THE INVENTION

This invention relates to a loudspeaker system for vehicles.

2. DESCRIPTION OF THE PRIOR ART

In using radio and tape recorder devices intended for vehicles having a sterophonic sound reproduction, there is a problem in mounting the loudspeakers in the vehicle in a suitable manner. It is known to mount the loudspeakers on the so-called hatrack at the back window of the vehicle, but this results in that the sound intensity must be high for enabling the front seat passengers to catch the sound. In this case the back seat passengers will, however, perceive the sound as painfully loud. It is also known to mount the loudspeakers in connection with the dashboard of the vehicle, but of course this location of the loudspeakers results in the corresponding drawbacks. A suitable location as regards the audibility would be under the ceiling of the vehicle, but such a location results in problems in fastening the loudspeakers. Fastening the loudspeakers on the ceiling would cause destruction of the headlining thereof.

SUMMARY OF THE INVENTION

Thus, the purpose of this invention is to provide a loudspeaker system suited for mounting on the ceiling of the vehicle and making it possible to mount the loudspeaker system on the ceiling without damaging the headlining thereof.

According to the invention, this is achieved by the loudspeakers being connected with each other for providing a continuous unit and by the end portions of said unit being arranged to be fastened to the edge at both sides of the ceiling of the vehicle so that the loudspeakers are supported and there is no need for any additional connection with the ceiling of the vehicle.

By means of very small screws or similar fastening devices a loudspeaker system designed in this way can be fastened to the side edges of the ceiling in close vicinity to the top edges of the doors or the side windows of the vehicle. Owing to the connection between the loudspeakers the inner ends thereof do not have to be fastened so that the loudspeakers will so to say support each other in a position bearing on the ceiling.

Preferably the loudspeaker system comprises a monolithic, elongated element including end portions thereof constituting loudspeaker cabinets. The elongated element is preferably designed in such a way that it has a close fit against the ceiling of the vehicle in which the loudspeaker system is to be mounted, whereby said element can have an open upper end facing the ceiling. This results in that the loudspeaker can be made simply at low costs substantially in one single operation.

DESCRIPTION OF THE DRAWING

Referring to the accompanying drawing, the invention will be described more in detail below.

FIG. 1 shows in a perspective view the loudspeaker according to the invention.

FIG. 2 is a sectional view of a part of the loudspeaker of FIG. 1, said loudspeaker being mounted on the ceiling of the vehicle.

DESCRIPTION OF THE PREFERRED EMBODIMENTS

In the preferred embodiment shown in the drawing, the loudspeaker system according to the invention comprises an integrally formed element 2, preferably made from plastics, and loudspeakers 4 mounted therein. The element 2 is of elongated shape and is designed in such a way that it has a close fit against a ceiling (i.e. the headlining thereof) on which the system is to be mounted. In FIG. 2 the distance between the headlining 11 of the ceiling and the upper edges of the element 2 is exaggerated for the sake of clarity. The element 2 has an open upper end and provides at each of its ends a cabinet 6 for the loudspeakers 4. The cabinets 6 are in a conventional manner provided with openings 8 for improving the propagation of sound from the loudspeakers. At its ends the element 2 is provided with holes 10 for accepting fastening screws 12. By means of these screws 12 the whole loudspeaker system can be easily fastened to the sheet metal beams 9 present immediately above the doors 13 or the side windows of the vehicle. The headlining 11 of the ceiling is also fastened to these beams. Fastening of the element 2 is accomplished by driving the screws 12 through the headlining 11 and the sheet metal beams 9. Thus, the only damage caused to the ceiling is the holes for the screws 12. By having the loudspeaker system designed as an integrally formed unit there is no need for connecting the unit to the ceiling 11 between the ends thereof. Thus, the loudspeaker system according to the invention can be mounted without any substantial damage to the ceiling of the car.

In the embodiment described above the top sides of the loudspeaker cabinets 6 are closed by the ceiling 11 of the vehicle. Thus, the acoustic characteristics of the ceiling will have an influence on the quality of sound. In certain cases this is a problem. In a modified embodiment of the invention (not shown in the drawing), therefor the element 2 can be provided with a top cover closing the top side of the cabinets, if the acoustic dampening characteristics of the ceiling are inappropriate.

By having the top cover on the element 2 it is possible to place a correct amount of acoustic dampening material of suitable density in the cabinets whereby the quality of sound can be optimized.

When the element 2 is closed, whether this is accomplished by the ceiling or by the top cover, the sound waves inside the element 2 emanating from one of the loudspeakers 4 will affect the diaphragm of the other loudspeaker causing this diaphragm to move in a not intended way. However, this problem can easily be cured by providing a partition wall closing the passage in the element between the cabinets.

The location of loudspeaker system made possible by designing the element according to the invention results in great advantages as regard the distribution of sound between the front and rear seats and as regards the sterophonic effect if the loudspeakers are parts of a sterophonic system.

The invention could be modified within the scope of the annexed claims. Thus, it is possible to provide two separate loudspeaker cabinets which in a suitable manner are rigidly connected with each other for achieving the effect of having the cabinets supporting each other when mounted on the ceiling.

We claim:

1. A loudspeaker system for vehicles comprising at least two loudspeakers to be mounted on the ceiling of the vehicle, said loudspeakers being connected to each other and to the ceiling by means of an elongated element and characterized in that the top side of said element has a shape corresonding to the shape of the ceiling, end portions of said element being directed downwardly for permitting the element to be fastened to the vehicle above the level of the doors and side windows thereof and said element near its ends comprising cabinets for the loudspeakers.

2. A loudspeaker system according to claim 1 wherein the element end portions include fastener accepting apertures for fastening the element to sheet metal beams along the opposite ceiling sides.

3. A loudspeaker system according to claim 1 wherein the elongated element has an open upper end and is designed so as to have a close fit against the ceiling for which the loudspeaker system is intended whereby the element is closed when mounted on the ceiling.

4. A loudspeaker system according to claim 1 wherein said element and said cabinets are a monolithic structure and further comprising a top cover for closing the cabinets.

5. A loudspeaker system according to claim 1 wherein said element and said cabinets are an upwardly open monolithic structure which has a close fit against the ceiling whereby the element is essentially closed by the ceiling when mounted on the ceiling.

6. A loudspeaker system according to claim 1 wherein the interior of said cabinets are separated from each other by means of a partition wall provided at an intermediate portion of said element.

* * * * *

UNITED STATES PATENT AND TRADEMARK OFFICE
CERTIFICATE OF CORRECTION

PATENT NO. : 4,099,026

DATED : July 4, 1978

INVENTOR(S) : Per Persson, et al.

It is certified that error appears in the above-identified patent and that said Letters Patent are hereby corrected as shown below:

Col. 1, line 10, change "sterophonic" to -- stereophonic --.

Col. 2, line 60, change "sterophonic" to -- stereophonic --.

Col. 2, line 61, change "sterophonic" to -- stereophonic --.

Claim 1, Col. 3, line 6, change "corresonding" to -- corresponding --.

Signed and Sealed this

Sixteenth Day of January 1979

[SEAL]

Attest:

RUTH C. MASON
*Attesting Officer*

DONALD W. BANNER
*Commissioner of Patents and Trademarks*